June 3, 1947.  G. H. TYNE  2,421,444
BOBBIN-WOUND COIL
Filed Aug. 5, 1944
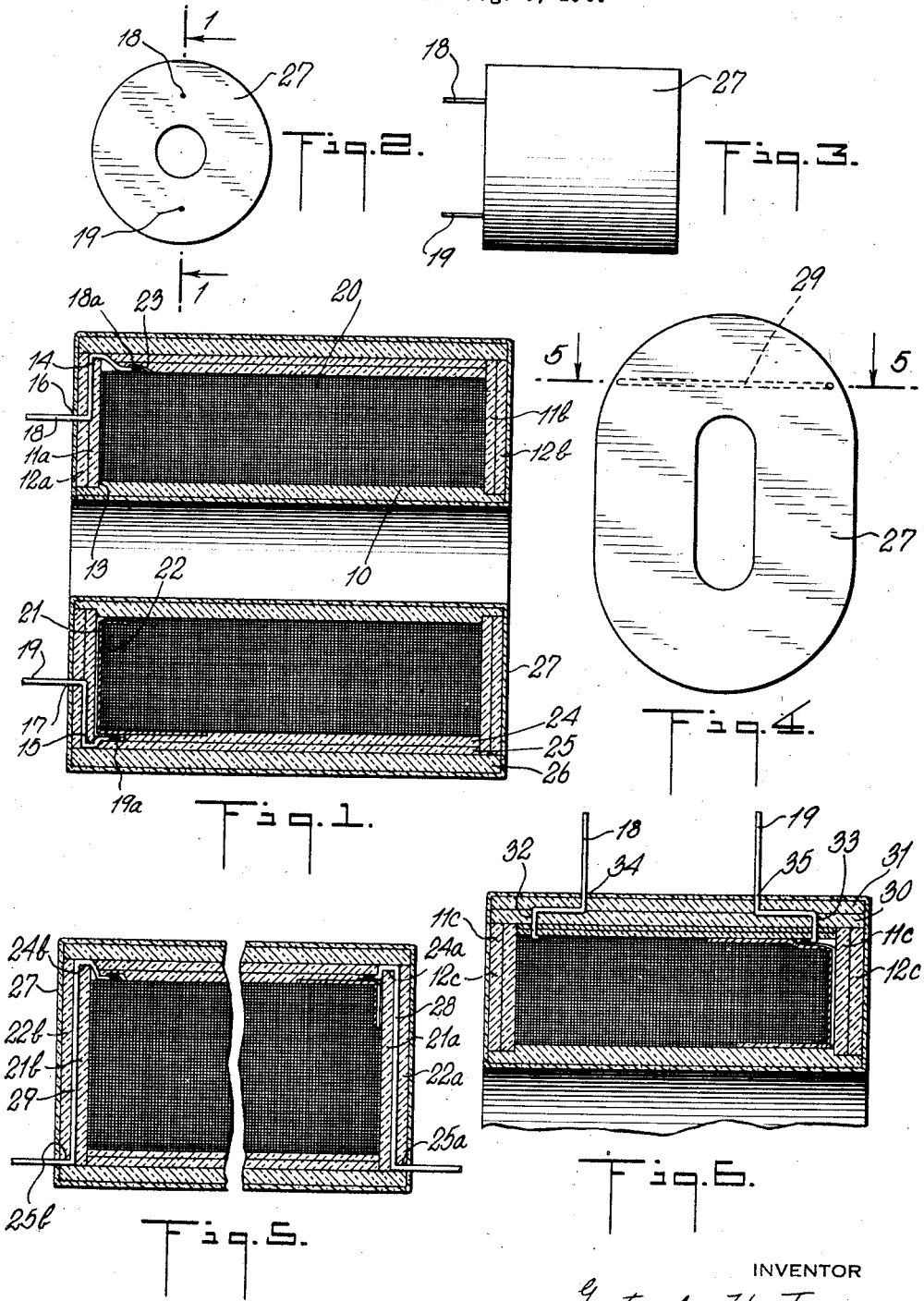
INVENTOR
Gertrude H. Tyne
BY
Kenyon & Kenyon
ATTORNEYS Patented June 3, 1947

2,421,444

UNITED STATES PATENT OFFICE 2,421,444

BOBBIN-WOUND COIL

Gertrude H. Tyne, New York, N. Y., assignor, by mesne assignments, to Allied Control Company, Inc., New York, N. Y., a corporation of New York Application August 5, 1944, Serial No. 548,214

8 Claims. (Cl. 175—21)

This invention relates to bobbin-wound coils.

In a conventional bobbin-wound coil, the bobbin consists of a core provided with a pair of heads or end flanges and the coil fills the space between the flanges. Each lead wire for the coil extends over the edge of a flange and moisture-retardant material is applied around the coil. It is not possible on a production basis to obtain a satisfactory moisture-retardant seal for the coil around the lead wires with this type of construction.

An object of this invention is to provide an improved moisture-retardant seal for the lead wires of a bobbin-wound coil.

In one embodiment of this invention, at least one bobbin head or flange is composed of two plates composed of a thermoplastic material, such, for example, as cellulose acetate, but preferably each flange is of this construction. Between the two thermoplastic plates of one or both flanges there is arranged a lead wire for each end of the coil. The lead wire as it leaves the coil may either enter between the plates by way of a notch in the rim of the inner plate or through an aperture in said plate spaced from its periphery. The lead wire may emerge from between the plates by way of a notch at the periphery thereof or through a hole in the outer plate. In any event, a portion of the lead wire is located between the two plates. After introduction of a portion of a lead wire between the two plates, the latter are sealed together around the lead wire portion either by use of a suitable solvent or by the application of heat and pressure to the plates or by use of a solvent in combination with the application of heat and pressure. With this construction, a portion of each lead wire lies wholly within the periphery of the bobbin flange. A coating of moisture-retardant material is applied to the coil proper and extends over the flange peripheries. The lead wires are completely encased in moisture-retardant material and a much improved seal for the coil is obtained.

Other objects, novel features and advantages of this invention will become apparent from the following specification and accompanying drawings, wherein:

Fig. 1 is a longitudinal section through a coil embodying the invention substantially on the line 1—1 of Fig. 2;

Fig. 2 is an end view of Fig. 1 on a reduced scale;

Fig. 3 is a side elevation of Fig. 2;

Fig. 4 is an end view of a modification;

Fig. 5 is a section on the line 5—5 of Fig. 4, and

Fig. 6 is a fragmentary longitudinal section of a still further modification.

In Fig. 1, 10 is the core of a bobbin having a pair of end flanges each composed of an inner plate 11a and an outer plate 12a and corresponding plates 11b and 12b at the other end. The core and flange plates are composed of a suitable thermoplastic material, such, for example, as cellulose acetate and the flange plates have central apertures through which extend the reduced end portions of the core 10 with each end flange abutting a shoulder 13 of the core. The inner plate 11a is provided with two peripheral notches 14 and 15 while the plate 12a is provided with apertures 16 and 17. A stranded lead wire 18 passes through the hole 16 and is turned at right angles to extend from the inner end of said hole to the periphery of the plate 11a and then passes through the notch 14 to the space between the two inner plates 11a and 11b. A lead wire 19 passes through the hole 17 and between the plates 11a and 12a to the notch 15 through which it passes into the space between the two inner plates 11a and 11b. Both lead wires are sealed between the plates 11a and 12a either by use of a suitable solvent such as acetone or by heat and pressure applied to the two plates 11a and 12a or by use of a solvent in combination with the application of heat and pressure. Preferably, the lead wires 18 and 19 are located between the plates 11a and 12a and said plates sealed together before assembly with the core 10. Although both lead wires 18 and 19 have been shown as assembled with the same pair of plates, the invention comprehends that one lead wire may be arranged between the two plates 11a and 12a and the other lead wire arranged between the plates 11b and 12b in the same manner as lead wires 28 and 29 hereinafter described.

A wire coil 20 is wound around the core 10 between the inner plates 11a and 11b with the end 21 of the inner coil layer extending outwardly along the inner surface of the plate 11a and insulated from the turns of the coil by a strip of insulating tape, for example, acetate tape in the usual manner, the end of this wire being fastened to the inner end of the lead wire 19 forming a tip 19a. The end 23 of the outer layer of the coil 20 is fastened to the inner end of the lead wire 18 forming a tip 18a. Preferably, the lead wires are silver soldered to the coil ends.

The coil 20 is enclosed with a layer 24 of insulating tape such as cellulose acetate tape and the tips 18a and 19a of the lead wire and ends of the coil are folded over into engagement therewith. A second layer 25 of similar insulating tape is then applied around the infolded tips 18a and 19a. An insulating covering 26 preferably of cellulose acetate cloth scotch tape overlies the entire assembly and extends flush with the surfaces of the plates 12. A final coating 27 of sealing lacquer such as acetate lacquer is applied by dipping the assembled coil into a suitable solution.

In the modification of Figs. 4 and 5, the plate 21a is provided with a peripheral notch 24a as before and the plate 22a is also provided with a peripheral notch 25a. The plates 21b and 22b are provided with similar notches 24b and 25b. The lead wires 28 and 29 are sealed between the plates 21a and 22a and 21b and 22b as previously described with each lead wire extending through a notch 24a or 24b from the space between the plates and through the notch 25a or 25b to the exterior of the coil. Otherwise, the structure of this modification is the same as previously described. If desired, both lead wires 28 and 29 may be arranged between the two plates of a single flange in the same manner as the lead wires 18 and 19 heretofore described.

In the modification of Fig. 6, the coil structure is the same as that of Fig. 1 except that the plates 11c and 12c have no peripheral notches and two sleeves 30 and 31 of thermoplastic material surround the coil with the sleeve 31 enclosing the sleeve 30. The sleeve 30 has two holes 32 and 33 while sleeve 31 has two holes 34 and 35, the holes 34 and 35 being in offset relation to the holes 32 and 33. The lead wire 18 passes from the coil through the hole 32, then between the sleeves 30 and 31 and finally through the hole 34 to the exterior of the assembly. The lead wire 19 passes through the hole 33, between the sleeves 30 and 31 and then through the hole 35 to the exterior of the assembly.

In each of the three modifications herein described, the lead wires are tightly enclosed by moisture-retardant material. The arrangement is such that substantially no gaps or channels exist along the lead wires by means of which moisture might have access to the winding. In each instance, the lead wires are thoroughly and completely covered and the entire assembly is enclosed in a protective coating with no exposed gaps or apertures.

It is of course understood that various modifications may be made in the coil herein described without in any way departing from the spirit of the invention as defined in the appended claims.

I claim:
1. A device of the character described comprising a wire coil, an insulating enclosure for said coil including a central portion around which said coil is wound, said enclosure consisting in part of a pair of contacting laminae, an electrical lead arranged between said laminae with one end extending into the enclosure and being connected to the coil and the other end extending exteriorly of said enclosure, a passageway between opposite faces of each laminae for receiving the electrical lead, said laminae being sealed together adjacent said lead to retard moisture flow along said lead into the enclosure.

2. A device of the character described comprising a bobbin having an end flange composed of two contacting members, a wire coil supported by said bobbin, and an electrical lead arranged between said members, a passageway between opposite faces of each member for receiving said lead, said members being sealed together adjacent said lead to retard moisture flow along said lead toward the coil.

3. A sealed coil comprising a bobbin having end flanges of which at least one is composed of two plates, a coil of wire on the bobbin between said flanges, a lead wire passing between the two plates of a flange, a passageway between opposite faces of each plate for receiving the lead wire, said plates being sealed together adjacent said lead wire to retard moisture flow along said lead toward the coil, and a coating of moisture retarding material enclosing said bobbin and coil.

4. A sealed coil according to claim 3 characterized by the two plates of one flange each having a peripheral notch for receiving the lead wire.

5. A sealed coil according to claim 3 characterized by one plate of one flange having a peripheral notch to receive the lead wire and the remaining plate of said flange having an aperture through which the lead wire projects.

6. A sealed coil comprising a bobbin having end flanges, a coil of wire on said bobbin between said flanges, a pair of superposed sleeves coaxial with said bobbin and enclosing the coil, a pair of apertures in each sleeve with the apertures in one sleeve being out of alignment with the apertures in the remaining sleeve and lead wires passing through said apertures and being sealed between said sleeves.

7. A device of the character described comprising a wire coil, an insulating enclosure for said coil consisting in part of a coil-supporting bobbin including a pair of end flanges, one end flange consisting of a pair of contacting laminae, an electrical lead arranged between said laminae with one end extending into the enclosure and being connected to the coil and the other end extending exteriorly of said enclosure, said laminae being sealed together adjacent said lead to retard moisture flow along said lead into said enclosure.

8. A device of the character described comprising a wire coil, an insulating enclosure for said coil including a central portion around which said coil is wound, said enclosure consisting in part of a pair of superposed sleeves surrounding said coil, an electrical lead arranged between said sleeves with one end extending into the enclosure and being connected to the coil and the other end extending exteriorly of said enclosure, a passageway between opposite faces of each sleeve for receiving the electrical lead, said sleeves being sealed together adjacent said lead to retard moisture flow along said lead into said enclosure.

GERTRUDE H. TYNE.

REFERENCES CITED

The following references are of record in the file of this patent:

UNITED STATES PATENTS

| Number | Name | Date |
|---|---|---|
| 865,907 | Jodrey | Sept. 10, 1907 |
| 1,752,866 | Trombetta | Apr. 1, 1930 |
| 1,815,212 | Ogg | July 21, 1931 |
| 1,956,881 | Strait | May 1, 1934 |
| 1,132,297 | Apple | Mar. 16, 1915 |
| 1,939,808 | Freeland | Dec. 19, 1933 |
| 2,184,272 | Driftmayer | Dec. 26, 1939 |
| 2,241,761 | Blaisdell | May 31, 1941 |
| 2,266,925 | Verrill | Dec. 23, 1941 |
| 2,275,967 | Keillor | Mar. 10, 1942 |

FOREIGN PATENTS

| Number | Country | Date |
|---|---|---|
| 107,688 | Australia | June 22, 1939 |
| 305,694 | Great Britain | Feb. 8, 1929 |
| 406,279 | Great Britain | Feb. 19, 1934 |
| 90,578 | Switzerland | Sept. 16, 1921 |